Nov. 16, 1965     S. D. WILTSE     3,218,095
TUBE COUPLING

Filed April 16, 1964     5 Sheets-Sheet 1

INVENTOR.
SUMNER D. WILTSE
BY
*Whittemore, Hulbert & Belknap*
ATTORNEYS

Nov. 16, 1965
S. D. WILTSE
3,218,095
TUBE COUPLING
Filed April 16, 1964
5 Sheets-Sheet 2
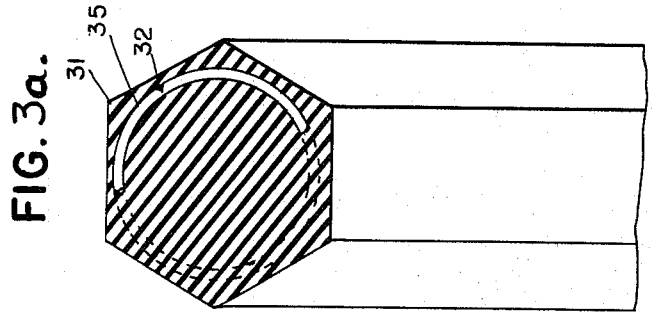
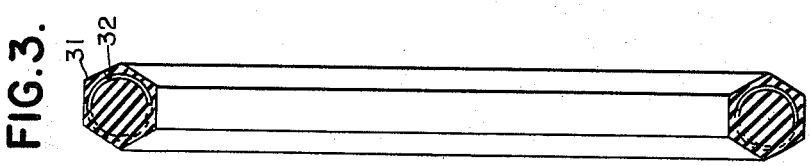
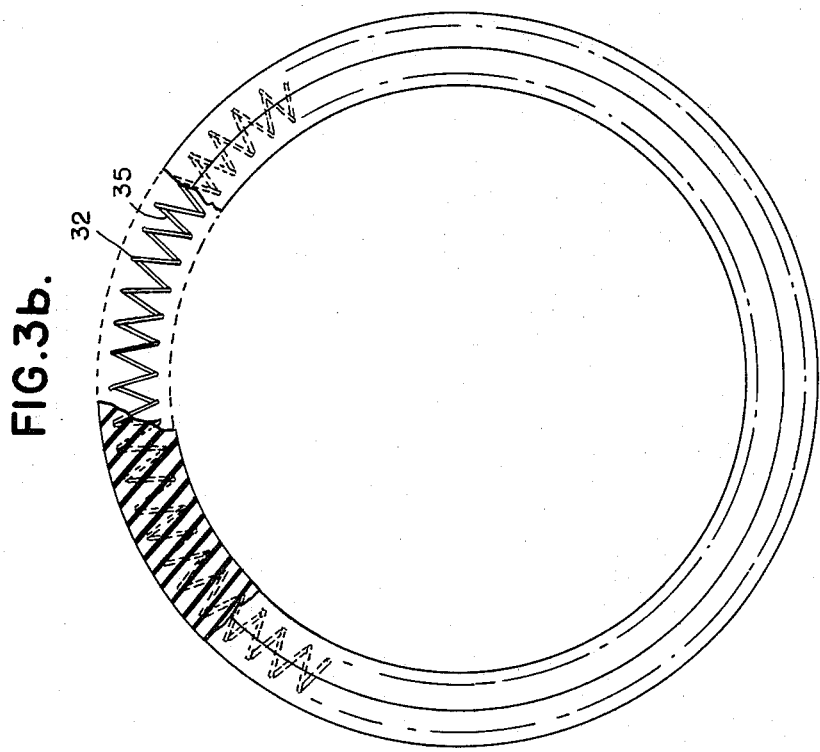
INVENTOR.
SUMNER D. WILTSE
BY
*Whittemore, Hulbert & Belknap*
ATTORNEYS Nov. 16, 1965  S. D. WILTSE  3,218,095
TUBE COUPLING
Filed April 16, 1964  5 Sheets-Sheet 3

INVENTOR.
SUMNER D. WILTSE
BY
Whittemore, Hulbert & Belknap
ATTORNEYS

Nov. 16, 1965 S. D. WILTSE 3,218,095
TUBE COUPLING
Filed April 16, 1964 5 Sheets-Sheet 4

INVENTOR.
SUMNER D. WILTSE
BY
*Whittemore, Hulbert & Belknap*
ATTORNEYS

Nov. 16, 1965  S. D. WILTSE  3,218,095
TUBE COUPLING

Filed April 16, 1964  5 Sheets-Sheet 5

INVENTOR.
SUMNER D. WILTSE
BY
ATTORNEYS

United States Patent Office 3,218,095
Patented Nov. 16, 1965

3,218,095
TUBE COUPLING
Sumner D. Wiltse, Detroit, Mich., assignor to Vibraseal Corporation, Detroit, Mich., a corporation of Michigan
Filed Apr. 16, 1964, Ser. No. 360,244
4 Claims. (Cl. 285—318)

This invention relates generally to tube couplings, and refers more particularly to an efficient means for coupling the flanged ends of two tubes to a tubular fitting.

One of the essential objects of the invention is to provide a tube coupling wherein the fitting is provided interiorly thereof substantially midway between opposite ends thereof with an annular portion, and the flanged ends of the two tubes are adapted to be received in substantially face-to-face relation with each other within the annular portion of said fitting.

Another object is to provide a tube coupling wherein two resilient sealing rings are adapted to cooperate with the flanged ends respectively of the tubes and with the fitting to retain the flanged ends of said tubes within the annular portion of said fitting.

Another object is to provide a tube coupling wherein the fitting is provided at opposite sides of the annular portion aforesaid with annular three-sided inwardly opening grooves or recesses, and the outer sides of the flanged ends of said tubes are provided with inclined surfaces respectively that are opposed to and substantially parallel with the outermost sides respectively of the three sides of said grooves.

Another object is to provide a tube coupling wherein each resilient sealing ring has a uniform hexagonal cross section throughout its circumference, whereby four surfaces respectively of said rings are adapted to have surface-to-surface sealing engagement with the inclined surfaces respectively of the flanged ends of said tubes and with the three sides of the grooves in said fitting, and are adapted to retain the flanged ends of said tubes in coupled relation with said fitting.

Another object is to provide a tube coupling wherein the fitting is provided upon the outer sides of the annular three-sided inwardly opening grooves with annular portions that are substantially in alignment with the annular portion aforesaid that is located substantially midway between the ends of the fitting.

Another object is to provide a tube coupling wherein the spaces respectively between the exterior surfaces of the tubes and the annular portions of the fitting are in each instance slightly greater than the cross sectional dimension between opposed surfaces of each of said hexagonal sealing rings, whereby such rings may be moved between the outer surfaces of the tubes and the annular portions of the fitting into the annular three-sided inwardly opening grooves in the fitting to retain the flanged ends of the tubes within the annular portion of the fitting.

Another object is to provide a tube coupling wherein the sealing rings are under compression when assembled as aforesaid with the fitting and with the flanged ends of the tubes and will effectively provide fluid-tight joints between the flanged ends of said tubes and said fitting.

Another object is to provide a tube coupling that is simple in construction, economical to manufacture, and efficient in operation.

Other objects, advantages and novel details of construction of this invention will be made more apparent as this description proceeds, especially when considered in connection with the accompanying drawings wherein:

FIGURE 3 is a vertical sectional view through one of the sealing rings.

FIGURE 3a is an enlarged fragmentary vertical sectional view through one of the sealing rings.

FIGURE 3b is an elevational view, partly in section, with parts broken away of one of the sealing rings.

Figure 6:
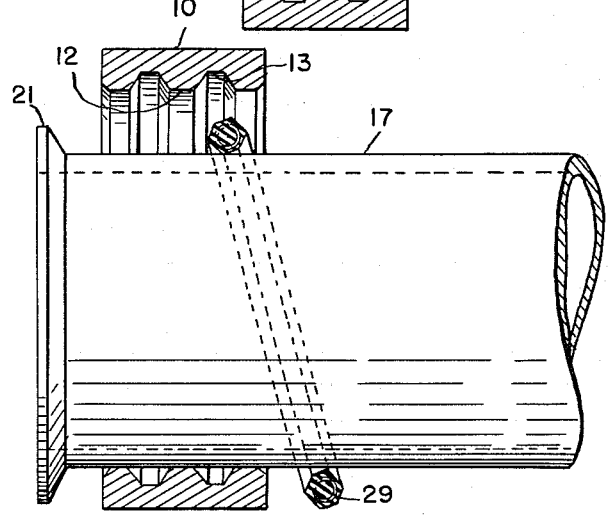

FIGURE 6 is a vertical sectional view through the fitting, showing the flanged end of a portion of one of the tubes inserted through the fitting in a lowered position relative to the fitting, and showing one of the sealing rings in position to be inserted in one of the annular three-sided inwardly opening grooves in the fitting during the alternative assembly of the tube and sealing ring with the fitting.

Figure 7:
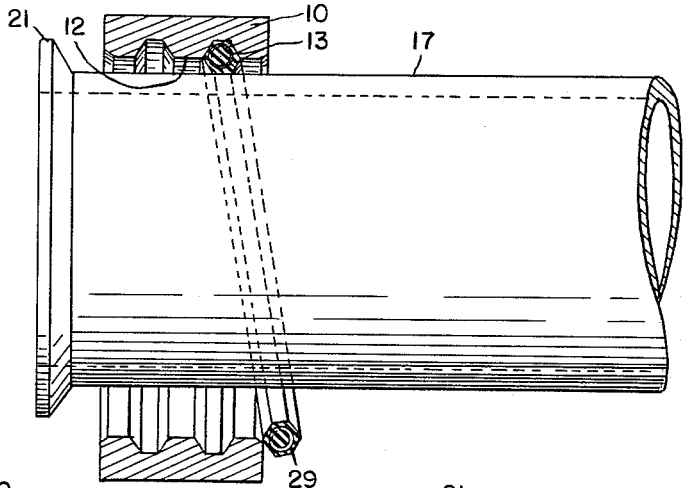

FIGURE 7 is a vertical sectional view through the fitting, showing the flanged end of a portion of one of the tubes inserted through the fitting and in raised position relative thereto, and showing the sealing ring partially inserted within one of the annular three-sided inwardly opening grooves in the fitting during the alternative assembly of the tube and sealing ring with the fitting.

Figure 1:
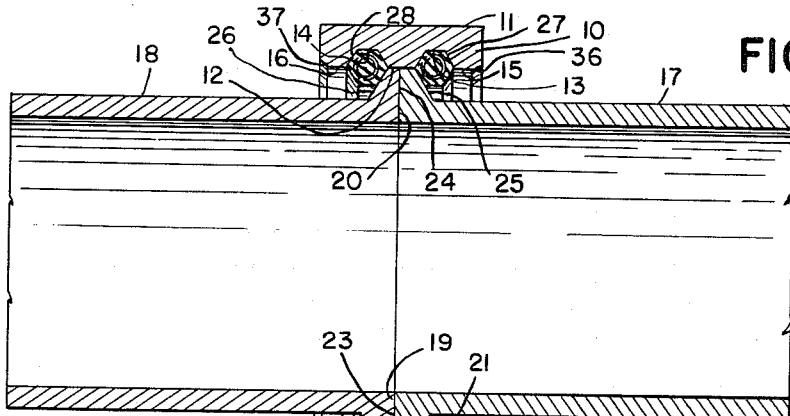
FIGURE 1 is a vertical sectional view through a tube coupling embodying my invention, and showing portions of the tubes broken away.
Figure 2:
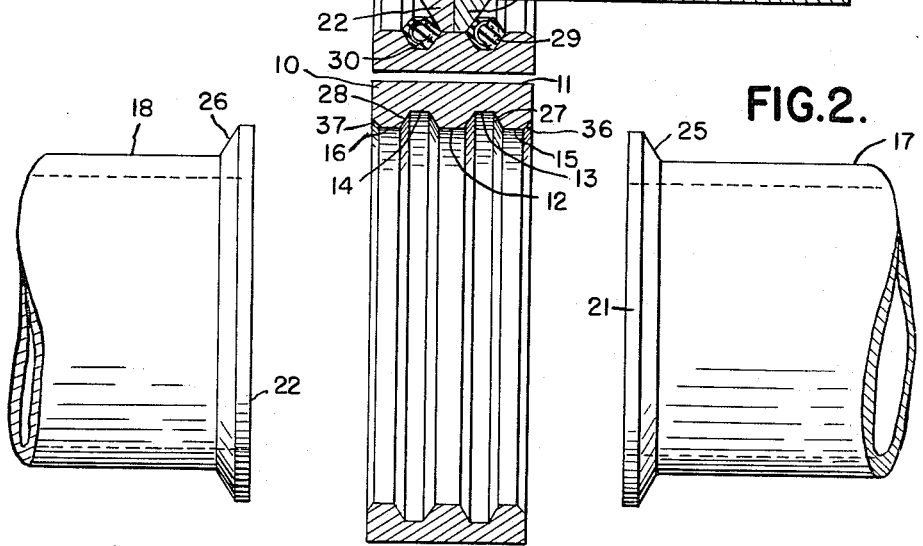
FIGURE 2 is an exploded view of portions of two tubes and of a vertical section through the fitting adapted to receive the flanged ends of said tubes.
Figure 8:
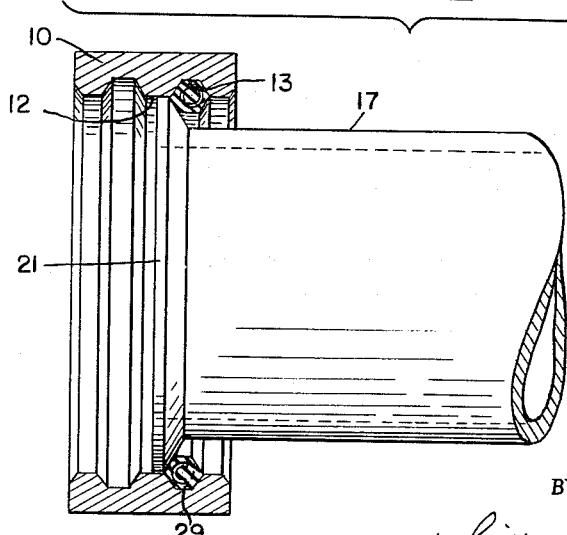
Figure 4:
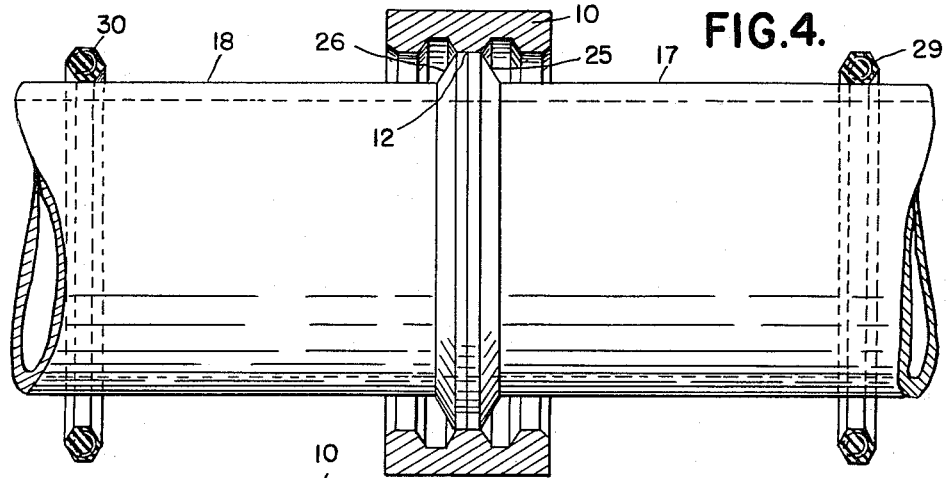
FIGURE 4 is a vertical sectional view through the fitting and showing portions of the two tubes in elevation in assembled relation with the fitting, and showing the sealing rings on the tubes before they are assembled with the fitting, during the preferred assembly of the parts.

FIGURE 8 is a vertical sectional view through the fitting, showing one of the sealing rings in completely assembled relation with one of the annular three-sided inwardly opening grooves in the fitting, and showing the flanged end of a portion of one of the tubes after the flanged end of the tube has been retracted within the annular portion of the fitting in engagement with the assembled sealing ring during the alternative assembly of the tube and sealing ring with the fitting.

Figure 9:
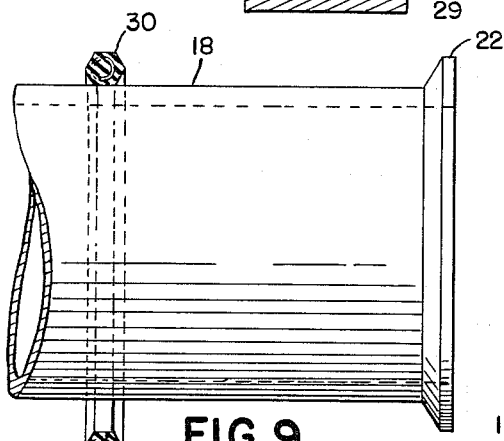
Figure 5:
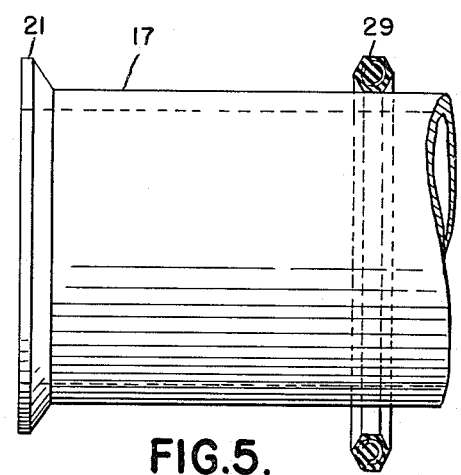
FIGURE 5 is a fragmentary elevational view of one of the tubes, and showing the sealing ring after it has been stretched over the flanged end of said tube during the alternative assembly of the tube and sealing ring with the fitting.

FIGURE 9 is an elevational view of the second tube and showing the second sealing ring after it has been stretched over the flanged end of said tube during the alternative assembly of the tube and sealing ring with the fitting.

Figure 10:
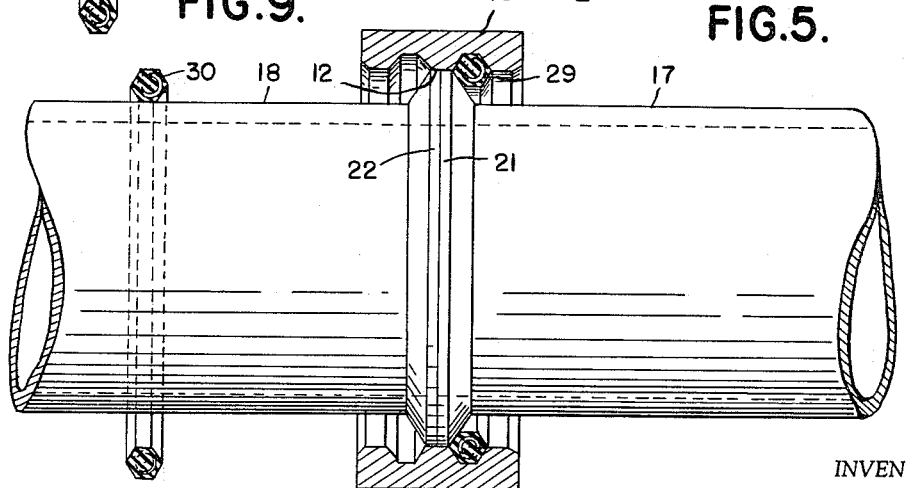

FIGURE 10 is a vertical sectional view through the fitting, showing the flanged end of the second tube inserted within the annular portion of the fitting in face-to-face relation with the assembled flanged end of said first tube, and showing the second sealing ring before it is inserted within the second annular three-sided inwardly opening grooves in the fitting during the alternative assembly of the tube and sealing ring with the fitting.

Figure 11:
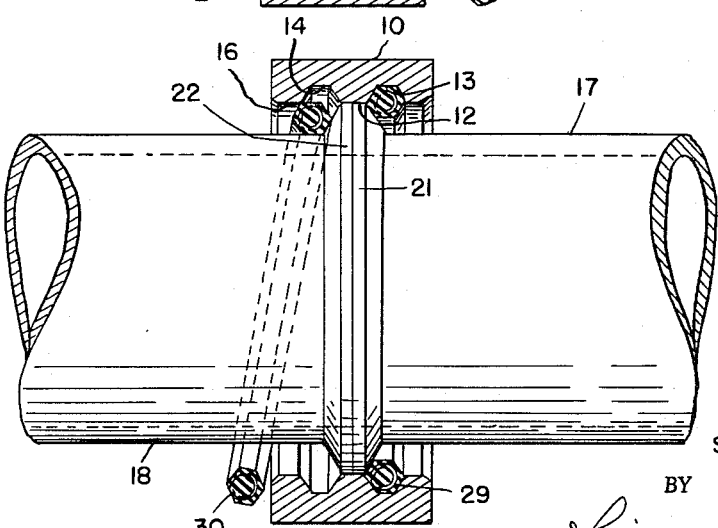

FIGURE 11 is a view similar to FIGURE 10 but showing the second sealing ring partially inserted within the fitting in position to be inserted within the second annular three-sided inwardly opening groove in the fitting during the alternative assembly of the tube and sealing ring with the fitting.

Figure 12:
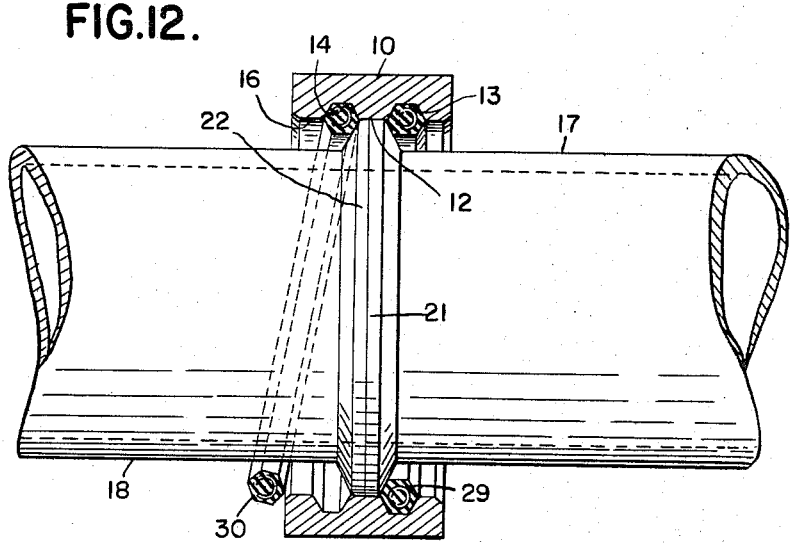

FIGURE 12 is a view similar to FIGURE 11 but showing the second sealing ring partially inserted within the other annular three-sided inwardly opening groove in the fitting during the alternative assembly of the tubes and sealing ring with the fitting.

Figure 13:
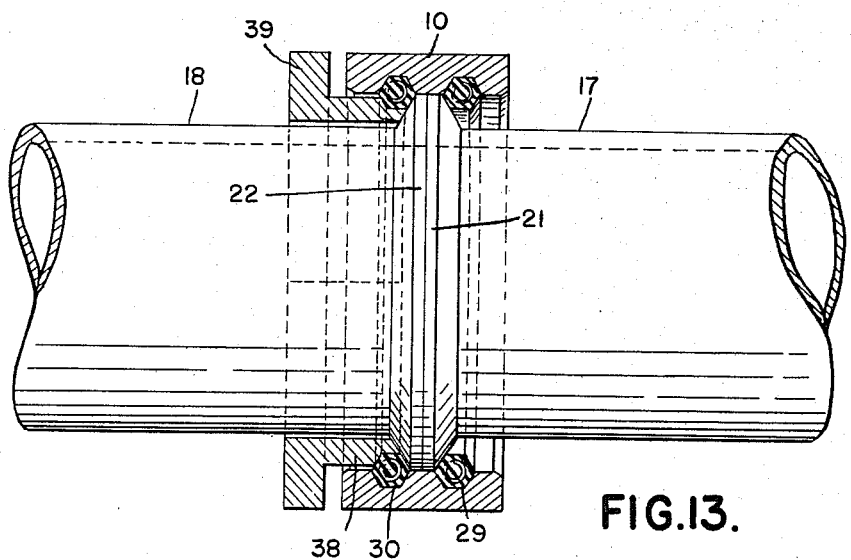

FIGURE 13 is a vertical sectional view through the fitting, showing the flanged ends of the two tubes in assembled relation with the annular portion of the fitting, showing the two sealing rings in assembled relation within the fitting, and showing a vertical sectional view through a longitudinally split flanged ring after the latter has been inserted into the fitting into engagement with the flanged end of the second tube and with the second sealing ring.

Referring now to the drawings, 10 is a tubular fitting of any suitable material having a circular outer surface 11 and having interiorly thereof at a point substantially midway between opposite ends thereof an annular portion 12. Located at opposite sides of the annular portion 12 are annular three-sided inwardly opening grooves or channels 13 and 14 respectively, while located at the outer sides of the grooves 13 and 14 are annular portions 15 and 16 respectively that are substantially in alignment with the annular portion 12.

17 and 18 respectively are substantially aligned tubes of any suitable material of substantially equal diameter extending axially of said fitting and having at their adjacent vertical ends 19 and 20 respectively outwardly projecting lateral flanges 21 and 22 respectively located within the annular portion 12 of the fitting 10 and provided with vertical faces 23 and 24 respectively that are flush with the vertical ends 19 and 20 respectively of said tubes and that are disposed in face-to-face relation with each other.

The flanges 21 and 22 are provided upon their outer sides with upwardly and inwardly inclined planar surfaces 25 and 26 respectively that are opposed to and that are substantially parallel with the outermost planar sides 27 and 28 respectively of the three planar sides of said grooves 13 and 14.

29 and 30 respectively are two composite sealing rings cooperating with the flanges 21 and 22 respectively of the tubes 17 and 18 and with the fitting 10 to retain the flanged ends of said tubes within the annular portion 12 of the fitting. In this connection, the inside diameter of each of the rings 29 and 30 is less than the diameter of each of the flanges 21 and 22 of the tubes 17 and 18, however, such rings 29 and 30 are expansible radially and are capable of being stretched over the flanges 21 and 22 of the tubes before the latter are assembled with the fitting 10.

As shown, each of the rings 29 and 30 preferably comprises an annular solid body 31 of rubber or rubber-like material or rubber composition, and an annular reinforcing metallic spring 32 concentric with and embedded within said annular body 31 in spaced relation to the planar surfaces thereof.

Preferably each annular body 31 has a uniform hexagonal cross section throughout its circumference, whereby four planar surfaces respectively of such annular bodies are adapted to have surface-to-surface sealing engagement with the inclined planar surfaces 25 and 26 respectively of the flanged ends of said tubes and with the three planar sides of said grooves 13 and 14 in the fitting 10 to provide fluid-tight seals and to retain the flanged ends of said tubes 17 and 18 in coupled relation with said fitting.

Each annular reinforcing metallic spring 32 is a hollow or tubular helix and is formed from a spiral wire spring having interconnected convolutions 35 that are substantially circular in cross section. Such convolutions 35 are also substantially uniform in diameter throughout the circumference of the spring.

To facilitate the assembly of the parts, the fitting 10 has at the outer sides of the annular portions 15 and 16 beveled or tapered edges 36 and 37 to not only permit the flanges 21 and 22 of the tubes to be inserted into the fitting 10, but also to permit a short length of a longitudinally split ring 38 to be inserted within the fitting 10. Such split ring 38 is preferably provided at its outer end with a laterally projecting flange 39 that serves as a finger piece by which the split ring may be conveniently manipulated. Moreover, the spaces respectively between the exterior surfaces of the tubes 17 and 18 and the annular portions 15 and 16 of the fitting are in each instance slightly greater than the cross sectional dimension between opposed surfaces of each hexagonal sealing ring, whereby such rings 29 and 30 may be moved between the outer surfaces of the tubes 17 and 18 and the annular portions 15 and 16 respectively of the fitting into the annular three-sided inwardly opening grooves 13 and 14 respectively in the fitting to retain the flanges 21 and 22 at the adjacent ends of the tubes within the annular portion 12 of the fitting.

To assemble the parts, the flanged ends of the tubes 17 and 18 may be inserted into the annular portion 12 of the fitting 10 to place the vertical faces 23 and 24 of the flanges 21 and 22 in face-to-face relation with each other. The sealing rings 29 and 30 may then be sleeved upon and slid along the tubes 17 and 18 into the spaces between the exterior surfaces of the tubes 17 and 18 and the annular portions 15 and 16 of the fitting, and then may be moved into the annular three-sided inwardly opening grooves 13 and 14 in the fitting 10, so that four planar surfaces respectively of each of the annular bodies 31 of such rings 29 and 30 respectively will have surface-to-surface sealing engagement with the inclined planar surfaces 25 and 26 respectively of the flanged ends of said tubes and with the three planar sides of the grooves 13 and 14 in the fitting.

As an alternative, the parts may be assembled by first stretching the ring 29 over the flange 21 of the tube 17 and then moving the ring 29 along the tube 17 a distance away from said flange 21. Then the flanged end of the tube 17 is inserted through the fitting 10, and thereafter the tube 17 is alternately lowered and then raised within the fitting 10 to enable the ring 29 to be inserted into the annular three-sided inwardly opening groove 13 in the fitting 10. The flanged end of the tube 17 is then retracted into the annular portion 12 of the fitting 10 against the assembled ring 29 with the mating surfaces in contact. The other ring 30 is first stretched over the flange 22 on the tube 18 and then is moved along the tube 18 a distance away from said flange 22. Then the flanged end of the tube 18 is inserted into the annular portion 12 of the fitting to place the vertical faces 23 and 24 respectively of the flanges 21 and 22 in face-to-face relation with each other. Then the ring 30 is slid along the tube 18 into the space between the exterior surface of the tube 18 and the annular portion 16 of the fitting 10, and then is moved into the annular three-sided inwardly opening groove 14 in the fitting 10.

When assembled as described, the sealing rings 29 and 30 will be under compression between the fitting 10 and the flanged ends of the tubes, and will effectively retain the flanged ends of said tubes 17 and 18 in coupled relation with said fitting 10. Also, such sealing rings 29 and 30 will provide fluid-tight joints between the flanged ends of said tubes 17 and 18 and said fitting 10. Moreover, the coupled tubes 17 and 18 provide a continuous smooth inner tube surface for fluids or materials passing through said tubes.

If desired, a thin annular gasket (not shown) may be used between the vertical faces 23 and 24 of the flanges 21 and 22 of said tubes. The annular reinforcing metallic spring or helix 32 has great shear resisting ability and also holds the annular bodies 31 of the rings 29 and 30 against displacement. If desired, the split ring 38 may be employed to forcibly move the flanges 21 and 22 of the tubes 17 and 18 and the sealing rings 29 and 30 to final assembled position relative to the fitting 10, or to tighten the joints therebetween.

Moreover, this tube coupling provides a means for connecting tubes or pipes quickly and easily without using bolts, flange lugs, bosses, screw threaded parts or other separate fastening means. In fact, such tube coupling can be very useful for large pipes, conduits, tubes and the like, and provides a rugged, strong, rigid tube or pipe assembly.

To facilitate disassembly of the parts, a suitable hook (not shown) may be engaged with the rings 29 and 30 to remove the same from the fitting 10, or cap screws or bolts (not shown) can be threaded vertically downwardly through the fitting 10 directly above the rings 29 and 30 and can be adjusted to remove the latter from the fitting 10.

What I claim as my invention is:

1. A tube coupling comprising a tubular fitting provided with a cylindrical exterior surface disposed concentric with the axis of said tubular fitting, provided interiorly thereof substantially midway its ends with an inwardly projecting annular portion having a cylindrical inner surface concentric with said cylindrical exterior surface, provided at opposite sides of said annular portion with annular inwardly opening grooves, each of said grooves having three laterally connecting planar sides, the intermediate of said three sides being cylindrical and concentric with said cylindrical exterior surface, the other of said sides forming equal obtuse angles with said intermediate side, said fitting being provided at the outer sides of said grooves with inwardly projecting annular portions respectively having cylindrical inner surfaces concentric with said cylindrical exterior surface and disposed substantially in alignment with the cylindrical inner surface of said first mentioned annular portion, two aligned tubular members of substantially equal diameter extending axially of said fitting and having substantially vertical ends disposed in opposed relation to each other, said tubular members being provided at said ends with outwardly projecting lateral flanges having cylindrical outer edges concentric with said cylindrical exterior surface and in surface-to-surface engagement with the cylindrical inner surface of said first mentioned annular portion, the opposed faces of said flanges being substantially vertical and being substantially flush with the vertical ends of said tubular members, the outer faces respectively of said flanges being upwardly and inwardly inclined planar surfaces opposed to and substantially parallel with the outermost of the other of said planar sides of said grooves, and means engaging the inclined planar surfaces of said flanges and the three laterally connecting planar sides of said grooves for retaining the flanges of said tubular members in coupled relation with said fitting and for providing fluid-tight joints between said flanges and said fitting, said means comprising two sealing rings, each having a uniform hexagonal cross section throughout its circumference, and each of said sealing rings including means to exert a continuous radially outwardly acting force on at least two of said planar sides, whereby four laterally connecting planar surfaces respectively of said rings have surface-to-surface sealing engagement with the entire periphery of the inclined planar surfaces respectively of said flanges and with the three laterally connecting planar sides of the grooves in said fitting.

2. The tube coupling defined in claim 1, wherein said means to exert a force comprises an annular reinforcing tubular helix embedded within each of said sealing rings in spaced relation to the surface thereof.

3. The tube coupling defined in claim 2, wherein said reinforcing helix comprises an annular spiral wire spring.

4. The tube coupling defined in claim 1, wherein the spaces respectively between the exterior surfaces of said tubular members and the last mentioned annular portions of said fitting are in each instance slightly greater than the cross sectional dimension between opposed planar surfaces of each of said sealing rings, whereby such rings may be moved between the exterior surfaces of said tubular members and the last mentioned annular portions of said fitting into surface-to-surface sealing engagement with the inclined planar surfaces of said flanges and with the three laterally connecting planar sides of the annular inwardly opening grooves in said fitting.

References Cited by the Examiner
UNITED STATES PATENTS

| | | |
|---|---|---|
| 2,444,119 | 6/1948 | Thorn et al. |
| 2,944,840 | 7/1960 | Wiltse _____ 277—235 X |
| 3,027,179 | 3/1962 | Wiltse. |

CARL W. TOMLIN, *Primary Examiner.*